(12) United States Patent
Kanduri et al.

(10) Patent No.: US 11,821,436 B2
(45) Date of Patent: Nov. 21, 2023

(54) HIGH EFFICIENCY AXIAL FAN

(71) Applicant: THERMO KING LLC, Minneapolis, MN (US)

(72) Inventors: Srikanth Kanduri, Hyderabad (IN); Ramesh Vedula, Bengaluru (IN); Preman Reynold Joseph, Hyderabad (IN); Sudalairaja Madasamy, Eral (IN); Ajaya Kumar, Minneapolis, MN (US); Harikrishnan Nayanar K, Annur (IN); Manivannan Loganathan, Salem (IN); Evan Jones, Minneapolis, MN (US); Ross Jones, Bloomingtion, MN (US); Bharath Gm, Shimoga (IN)

(73) Assignee: THERMO KING LLC, Minneapolis, MN (US)

( * ) Notice: Subject to any disclaimer, the term of this patent is extended or adjusted under 35 U.S.C. 154(b) by 0 days.

(21) Appl. No.: 17/826,666

(22) Filed: May 27, 2022

(65) Prior Publication Data
US 2022/0381260 A1    Dec. 1, 2022

(30) Foreign Application Priority Data

May 28, 2021 (IN) .............................. 202141023787

(51) Int. Cl.
| F04D 29/32 | (2006.01) |
| B60H 1/00  | (2006.01) |
| F04D 19/00 | (2006.01) |

(52) U.S. Cl.
CPC ....... F04D 29/329 (2013.01); B60H 1/00464 (2013.01); F04D 19/002 (2013.01)

(58) Field of Classification Search
CPC .. F04D 29/329; F04D 19/002; B60H 1/00464
USPC ...................................................... 416/204 r
See application file for complete search history.

(56) References Cited

U.S. PATENT DOCUMENTS

| 3,446,429 A * | 5/1969 | Tadayuki ............... F04D 19/002 416/246 |
| 3,449,605 A * | 6/1969 | Wilson ................. C08G 59/681 415/58.4 |
| 5,244,347 A * | 9/1993 | Gallivan ............... F04D 29/325 416/189 |
| 5,399,070 A * | 3/1995 | Alizaden ............... F04D 29/326 416/241 A |
| 5,513,951 A * | 5/1996 | Komoda ............... F04D 29/386 416/223 R |
| 5,577,888 A * | 11/1996 | Capdevila ............. F04D 19/002 165/122 |
| 5,730,583 A * | 3/1998 | Alizadeh ............... F04D 19/002 416/189 |
| 5,906,179 A   | 5/1999 | Capdevila |
| 5,957,661 A * | 9/1999 | Hunt ....................... F01D 5/141 416/223 R |
| 5,961,289 A * | 10/1999 | Lohmann ............... F04D 29/386 416/189 |

(Continued)

*Primary Examiner* — Logan M Kraft
*Assistant Examiner* — John D Bailey
(74) *Attorney, Agent, or Firm* — Hamre, Schumann, Mueller & Larson, P.C.

(57) ABSTRACT

A condenser fan includes a lock hub and multiple blades that are fastened to the hub. Each of the blades includes six planes, each of which having variable parameters including pitch angle, sickle, chord length, and blade curve. For each embodiment of the evaporator fan, the blades are identically configured.

15 Claims, 13 Drawing Sheets

(56) References Cited

U.S. PATENT DOCUMENTS

| | | | | |
|---|---|---|---|---|
| 6,065,937 A * | 5/2000 | Hunt | | F04D 29/326 |
| | | | | 416/189 |
| 6,206,641 B1 * | 3/2001 | Park | | F04D 29/384 |
| | | | | 416/182 |
| 6,254,342 B1 * | 7/2001 | Fujinaka | | F04D 29/384 |
| | | | | 415/208.5 |
| 6,368,061 B1 * | 4/2002 | Capdevila | | F04D 29/326 |
| | | | | 416/189 |
| 6,428,277 B1 * | 8/2002 | Holmes | | F04D 29/326 |
| | | | | 416/223 R |
| 6,554,574 B1 * | 4/2003 | Spaggiari | | F04D 29/384 |
| | | | | 416/243 |
| 6,558,123 B1 * | 5/2003 | Spaggiari | | F04D 29/384 |
| | | | | 416/243 |
| 8,251,674 B1 * | 8/2012 | Pairaktaridis | | F04D 25/0613 |
| | | | | 310/67 R |
| 8,770,941 B2 * | 7/2014 | Smith | | F03D 1/0608 |
| | | | | 416/223 R |
| 9,726,190 B2 * | 8/2017 | Kumon | | F04D 29/053 |
| 9,909,485 B2 * | 3/2018 | Hong | | F04D 29/164 |
| 10,060,440 B2 | 8/2018 | Fujimoto et al. | | |
| 10,174,768 B2 | 1/2019 | Shelton et al. | | |
| 10,247,201 B2 | 4/2019 | Hino et al. | | |
| 10,253,786 B2 | 4/2019 | Hino et al. | | |
| 10,473,113 B2 | 11/2019 | Usami et al. | | |
| 10,502,226 B2 | 12/2019 | Lu et al. | | |
| 10,550,846 B2 | 2/2020 | Hino et al. | | |
| 10,605,267 B2 | 3/2020 | Hino et al. | | |
| 10,781,826 B2 * | 9/2020 | Ishida | | F25D 17/062 |
| 10,808,714 B2 | 10/2020 | Ishii et al. | | |
| D901,669 S | 11/2020 | Bushnell et al. | | |
| 10,823,042 B2 * | 11/2020 | Nishio | | F04D 25/08 |
| 2003/0103846 A1 * | 6/2003 | Ohsuka | | F04D 29/384 |
| | | | | 416/223 R |
| 2004/0253111 A1 * | 12/2004 | Harris | | F04D 29/023 |
| | | | | 416/204 R |
| 2007/0031250 A1 * | 2/2007 | Suzuki | | F04D 29/667 |
| | | | | 415/220 |
| 2007/0031257 A1 * | 2/2007 | Suzuki | | F04D 29/666 |
| | | | | 416/182 |
| 2007/0243064 A1 * | 10/2007 | Nakano | | F04D 29/384 |
| | | | | 416/63 |
| 2008/0247874 A1 * | 10/2008 | Acre | | F04D 29/646 |
| | | | | 416/95 |
| 2010/0247316 A1 * | 9/2010 | Aynsley | | F04D 29/20 |
| | | | | 416/219 A |
| 2010/0247351 A1 * | 9/2010 | Kleber | | F04D 29/526 |
| | | | | 416/223 R |
| 2010/0260608 A1 * | 10/2010 | Suzuki | | F04D 29/34 |
| | | | | 416/204 R |
| 2012/0171042 A1 * | 7/2012 | Takeda | | F04D 29/32 |
| | | | | 416/223 R |
| 2012/0201705 A1 * | 8/2012 | Spaggiari | | F04D 29/263 |
| | | | | 417/423.14 |
| 2013/0093292 A1 * | 4/2013 | Mahfoudh | | F04D 29/329 |
| | | | | 310/67 R |
| 2013/0129533 A1 * | 5/2013 | Yin | | F04D 29/083 |
| | | | | 417/313 |
| 2014/0003933 A1 * | 1/2014 | Inada | | F04D 29/681 |
| | | | | 415/220 |
| 2014/0086730 A1 * | 3/2014 | Chang | | F04D 25/166 |
| | | | | 415/143 |
| 2014/0105749 A1 * | 4/2014 | Pellenc | | F04D 29/023 |
| | | | | 416/223 R |
| 2015/0071786 A1 * | 3/2015 | Kumon | | F04D 29/384 |
| | | | | 416/223 R |
| 2015/0125307 A1 * | 5/2015 | Kumon | | F04D 19/002 |
| | | | | 416/223 R |
| 2015/0152879 A1 * | 6/2015 | Tzeng | | F04D 19/002 |
| | | | | 416/223 R |
| 2015/0260200 A1 * | 9/2015 | Dreesen | | F04D 29/326 |
| | | | | 415/220 |
| 2016/0327057 A1 * | 11/2016 | Wu | | F04D 29/4226 |
| 2017/0058917 A1 * | 3/2017 | McKinney | | F04D 29/384 |
| 2017/0089595 A1 * | 3/2017 | Su | | F24F 13/24 |
| 2017/0159543 A1 * | 6/2017 | Hong | | F04D 29/384 |
| 2017/0234322 A1 * | 8/2017 | Ga Uss | | F04D 25/064 |
| | | | | 416/213 R |
| 2017/0298952 A1 * | 10/2017 | Learn | | F04D 29/582 |
| 2018/0051712 A1 * | 2/2018 | Henner | | F04D 29/326 |
| 2018/0111444 A1 * | 4/2018 | Kim | | B60K 11/06 |
| 2018/0195525 A1 * | 7/2018 | Hakozaki | | F04D 29/384 |
| 2018/0202465 A1 * | 7/2018 | Randall | | B01D 46/10 |
| 2018/0320705 A1 * | 11/2018 | Van Houten | | F04D 29/666 |
| 2019/0024668 A1 * | 1/2019 | Golm, Jr. | | F04D 25/0606 |
| 2019/0048890 A1 * | 2/2019 | Honma | | F04D 29/38 |
| 2020/0049166 A1 * | 2/2020 | Mosiewicz | | F04D 29/36 |
| 2020/0240433 A1 * | 7/2020 | Hoyt | | F04D 17/16 |
| 2020/0348089 A1 | 11/2020 | Halbe et al. | | |
| 2021/0010483 A1 * | 1/2021 | Sawada | | F04D 29/388 |
| 2021/0044175 A1 * | 2/2021 | Chang | | H02K 7/1807 |
| 2021/0115939 A1 * | 4/2021 | MacDonald | | C02F 1/048 |
| 2021/0206199 A1 * | 7/2021 | Baigh | | F04D 29/388 |
| 2021/0254625 A1 * | 8/2021 | Yi | | F04D 29/522 |
| 2022/0136522 A1 * | 5/2022 | Gao | | F04D 29/263 |
| | | | | 416/204 R |
| 2022/0221214 A1 * | 7/2022 | Tadokoro | | F04D 29/384 |

* cited by examiner

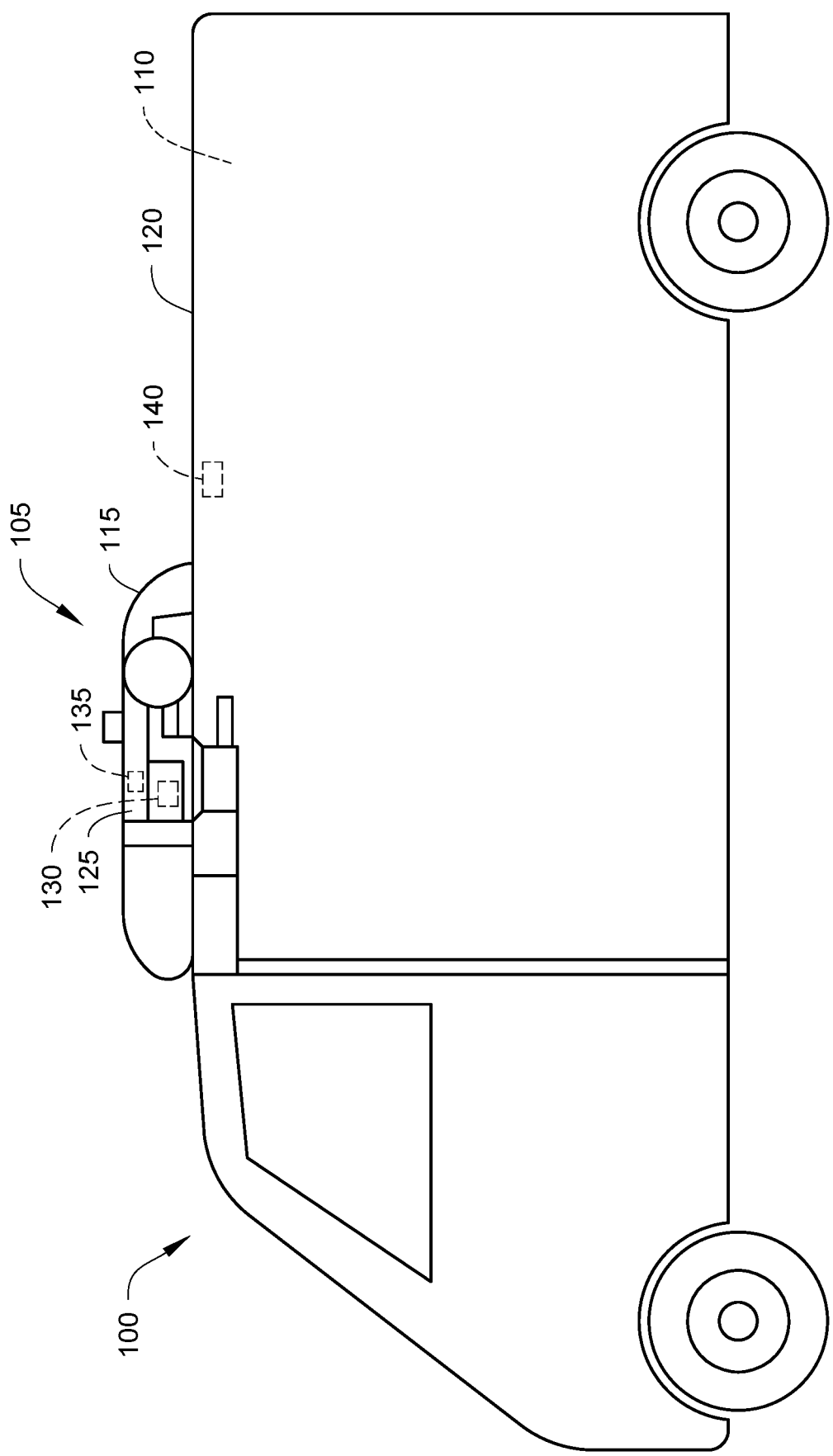

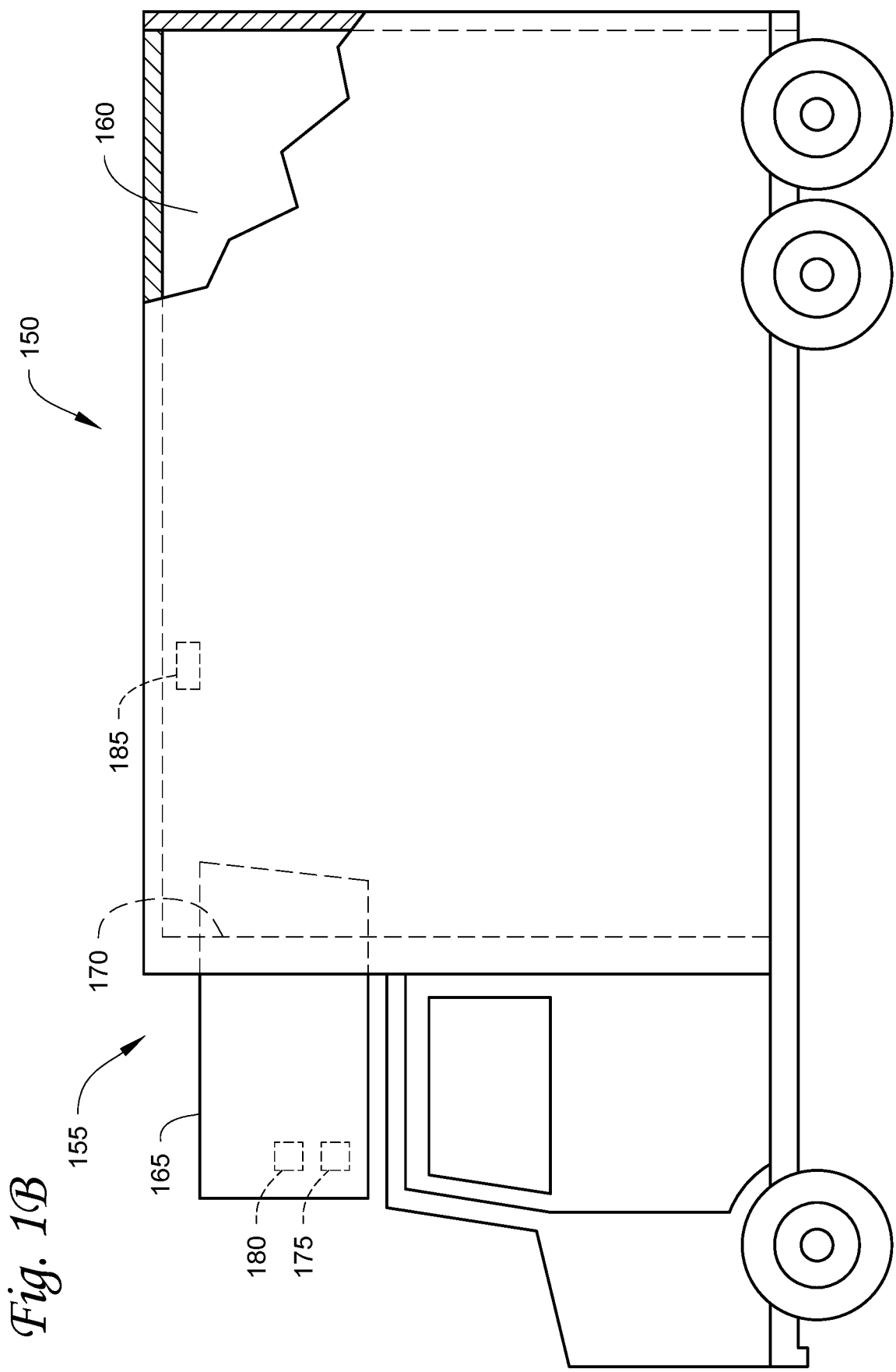

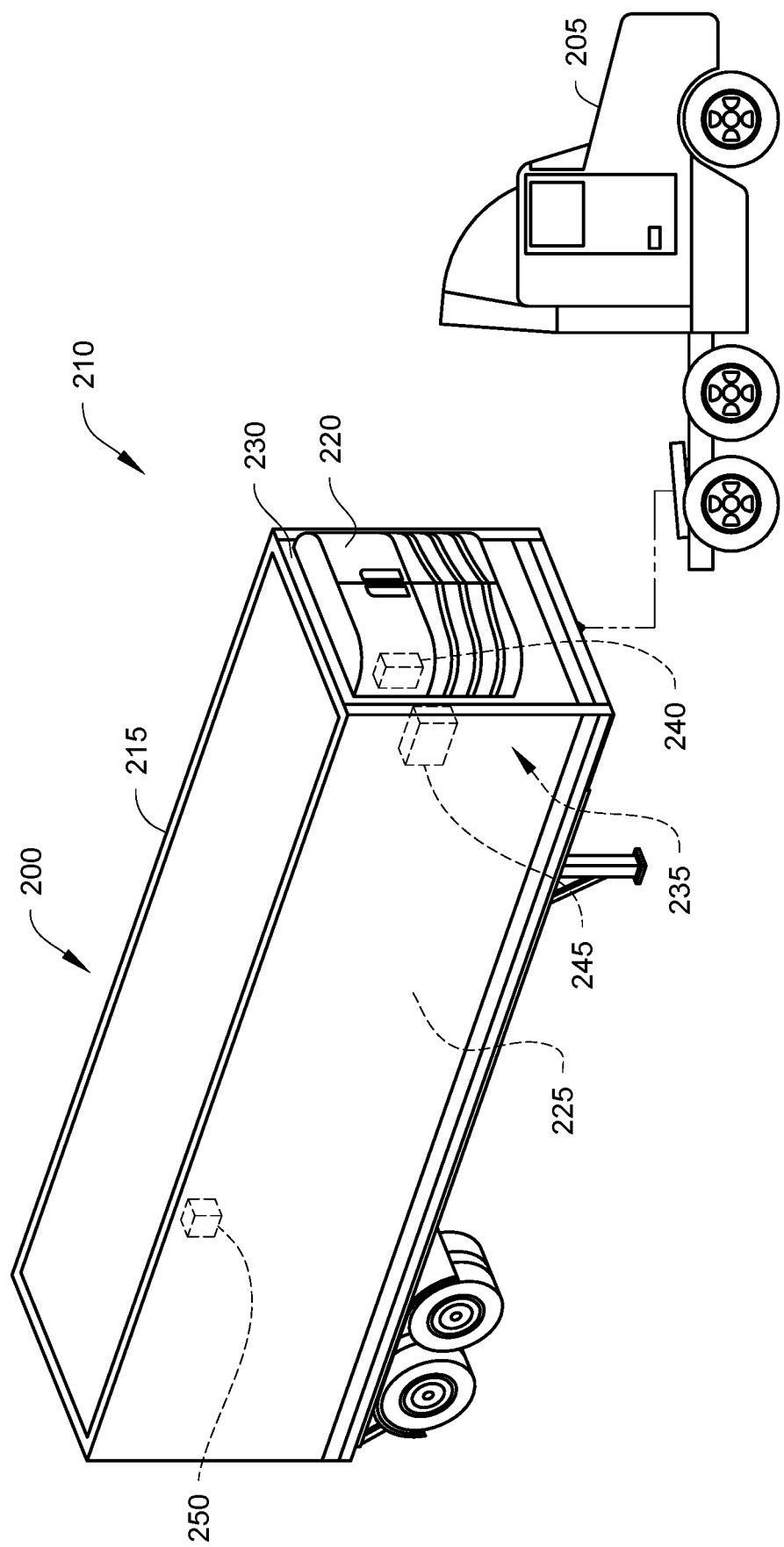

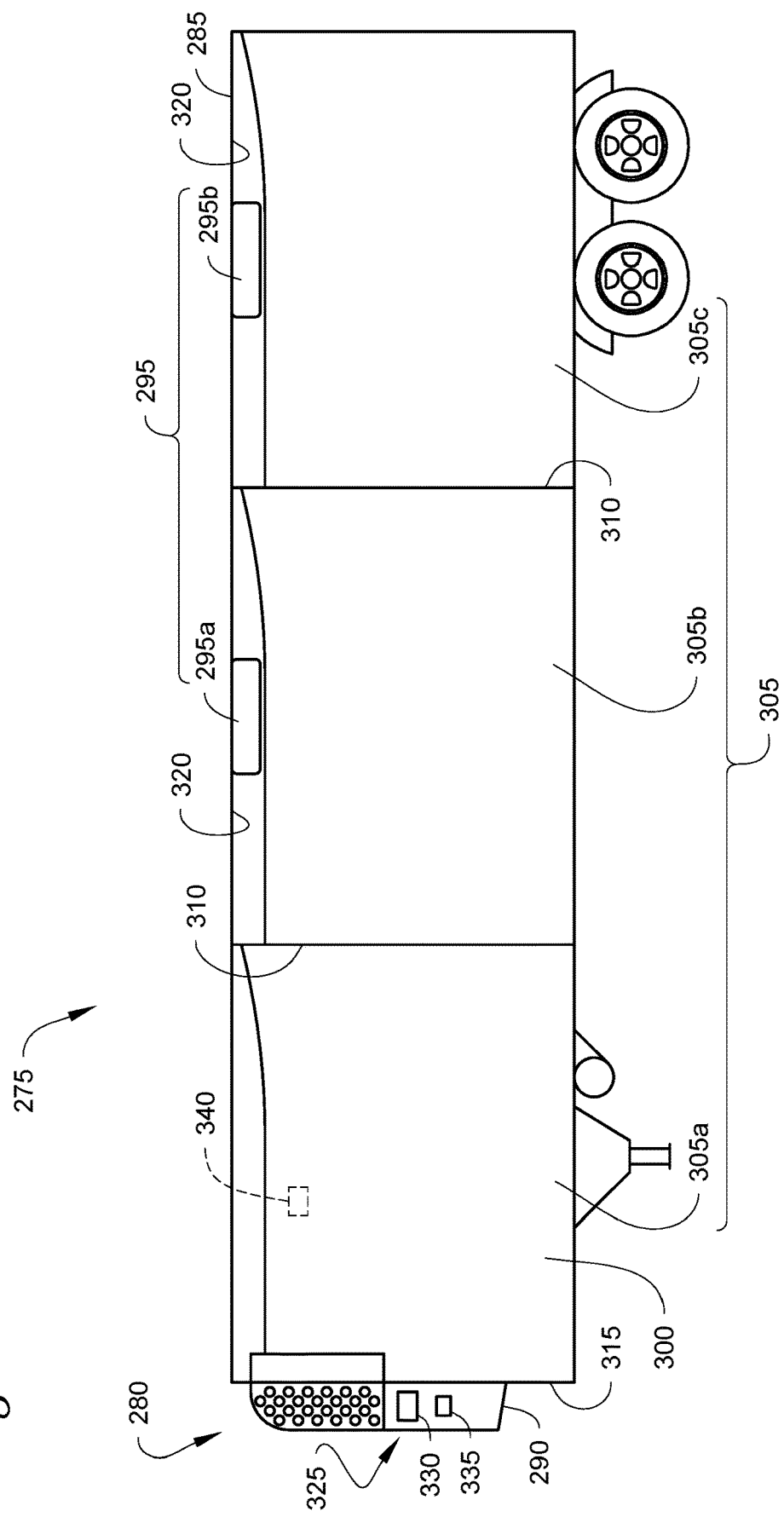

*Fig.* 7
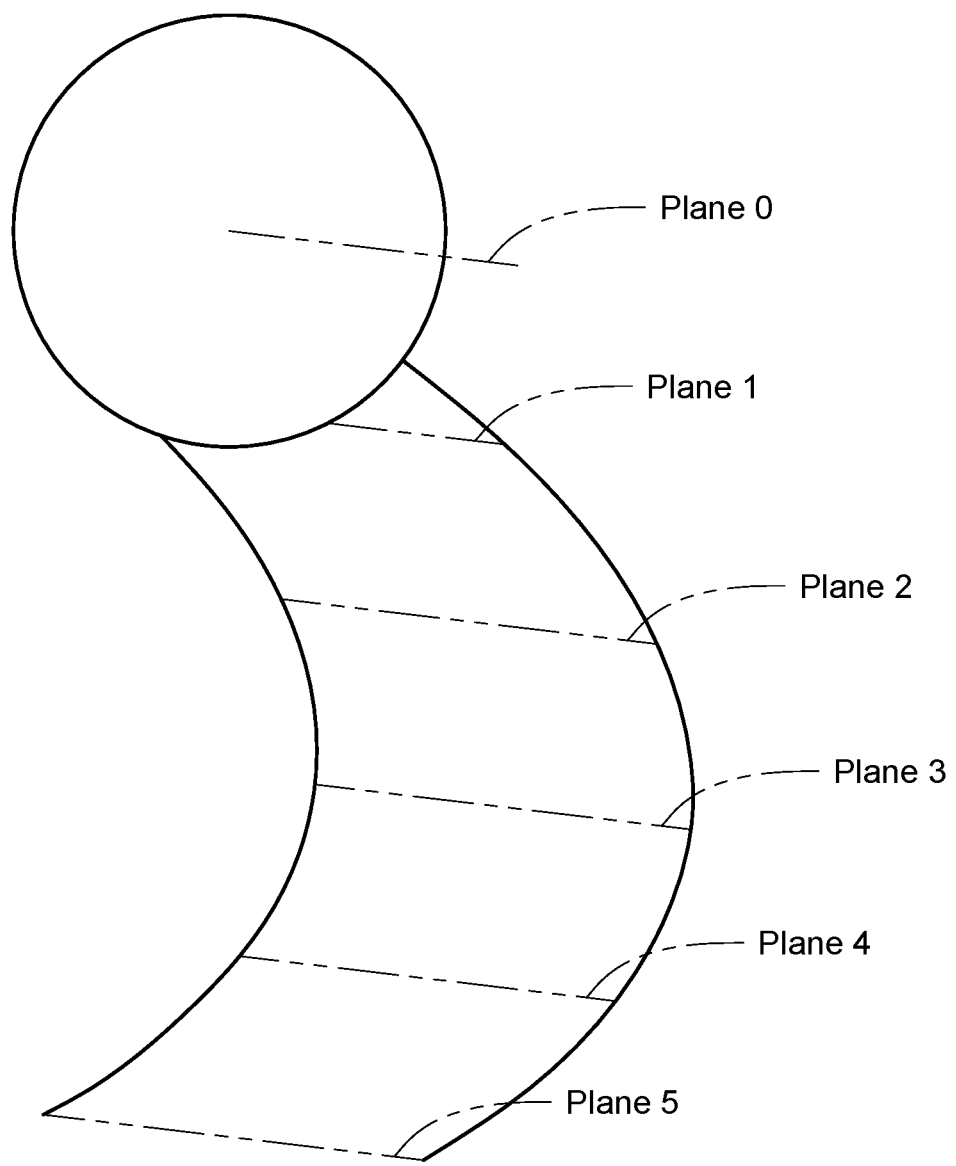

HIGH EFFICIENCY AXIAL FAN

FIELD

This disclosure relates generally to a transport climate control system. More specifically, this disclosure relates to an axial fan that contributes to supplying climate controlled air passing over, for example, a condenser into the climate controlled space of a climate controlled transport unit.

BACKGROUND

A transport climate control system is generally used to control one or more environmental conditions such as, but not limited to, temperature, humidity, air quality, or combinations thereof, of a transport unit. Examples of transport units include, but are not limited to a truck, a container (such as a container on a flat car, an intermodal container, a marine container, a rail container, etc.), a box car, a semi-tractor, a bus, or other similar transport unit. One or more condenser fans may be provided in such a system to, e.g., control the heat exchange between the air within the climate controlled space and the ambient air outside of the climate controlled transport unit.

SUMMARY

This disclosure relates generally to an axial fan that may be included in a transport climate control system to facilitate the heat exchange between the air within the climate-controlled space and the ambient air outside of the refrigerated transport unit.

In accordance with at least one embodiment described and recited herein, an axial fan has a hub to receive a lock hub that attaches the axial fan to a compressor and multiple blades that stem from the hub. Each of the blades has a leading edge and a trailing edge. From a front view of the axial fan relative to a stacking plane that extends from a center of the hub to a leading edge of the respective blade, the leading edge of a respective one of the blades overlaps a trailing edge of a preceding blade. The leading edge of each of the respective blades is downstream to the stacking plane. Also, a gap exists between a stem of the respective blade and a stem of the preceding blade, and the axial fan is a one-piece component produced by an injection molding process.

In accordance with at least one other embodiment described and recited herein, an axial fan has a hub and multiple blades fastened to the hub. Each of the blades includes six planes. The first plane has a chord length of 80, a sickle length of 50, a sickle percentage of +62.5, and a pitch of 119°. The second plane has a chord length of 110, a sickle length of 20.8, a sickle percentage of 18.9, and a pitch of 119°. The third plane has a chord length of 110, a sickle length of −22, a sickle percentage of −20, and a pitch of 119°. The fourth plane has a chord length of 110, a sickle length of −33, a sickle percentage of −30, and a pitch of 119°. The fifth plane has a chord length of 110, a sickle length of −22, a sickle percentage of −20, and a pitch of 119°. The sixth plane has a chord length of 110, a sickle length of 4, a sickle percentage of 3.6, and a pitch of 119.

In accordance with the embodiments described and recited herein, by customizing parameters of the blades of an axial fan for a condenser, the condenser fan may operate within the context of a known, static design to operate at speeds lower than known implementations, thus reducing power requirements without suffering from a loss of air blowing efficiency.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 1A a side view of a van with a transport climate control system, according to at least one embodiment described and recited herein.

FIG. 1B is a side view of a truck with a transport climate control system, according to at least one embodiment described and recited herein.

FIG. 1C is a perspective view of a climate controlled transport unit, according to at least one embodiment described and recited herein.

FIG. 1D is a side view of a climate controlled transport unit including a multi-zone transport climate control system, according to at least one embodiment described and recited herein.

FIG. 7 shows an example configuration of a fan blade of a condenser fan, according to at least one embodiment described and recited herein.

DETAILED DESCRIPTION

Figure 2:
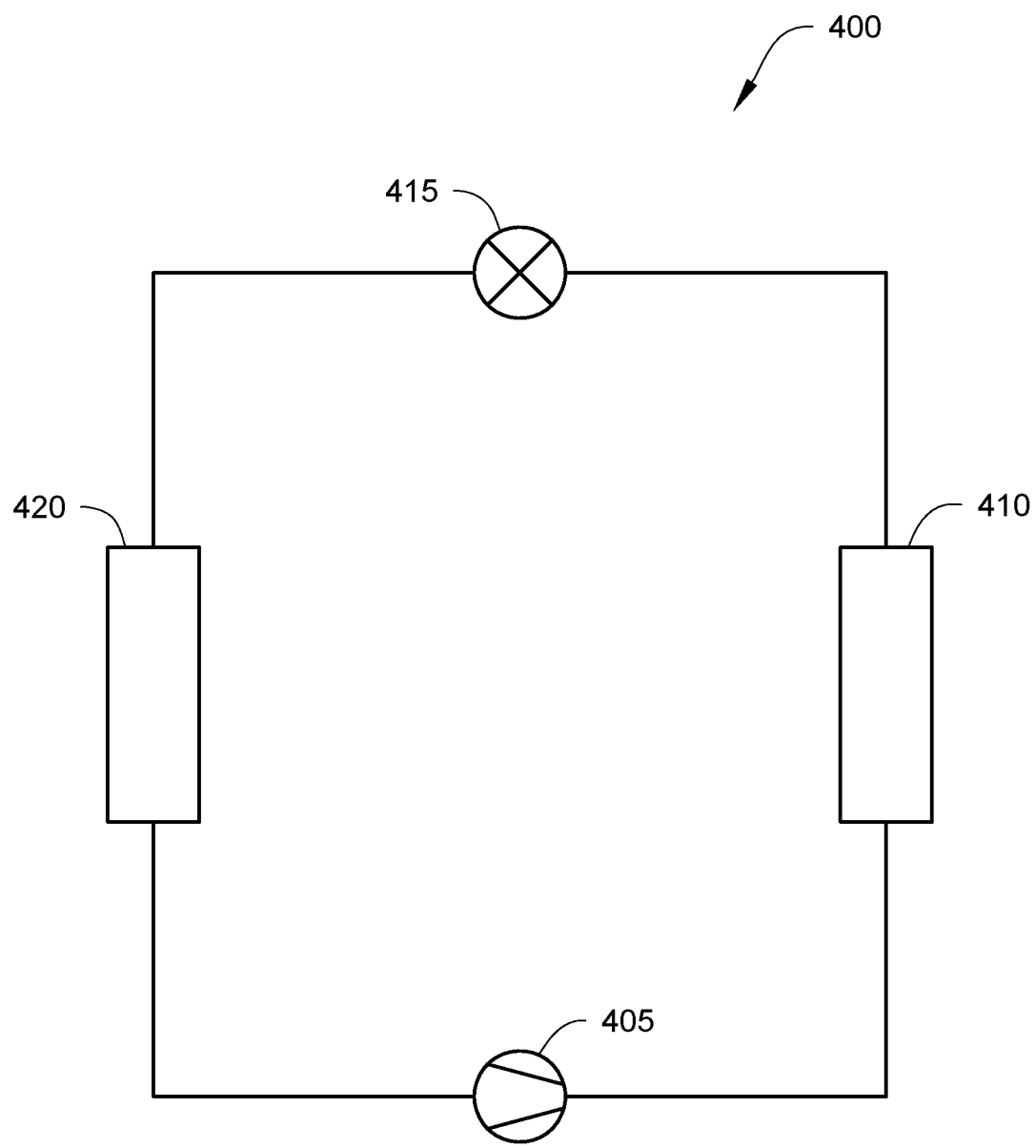
FIG. 2 shows a schematic diagram of a climate control circuit, according to at least one embodiment described and recited herein.

This disclosure relates generally to a transport climate control system. More specifically, this disclosure relates to a condenser, which may include one or more fans to control the heat exchange between the air within the climate controlled space and the ambient air outside of the refrigerated transport unit.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

In the present description and recitation, the following terms may be used, in addition to their accepted meaning, as follows:

A transport climate control system may control one or more environmental conditions within a transport unit that include but are not limited to temperature, humidity, air quality, or combinations thereof. Non-limiting examples of a transport unit may include, but not be limited to, a truck, a container (such as a container on a flat car, an intermodal container, a marine container, a rail container, etc.), a box car, a semi-tractor, a bus, or other similar transport unit. A refrigerated transport unit is commonly used to transport perishable items such as pharmaceuticals, produce, frozen foods, and meat products.

A climate controlled transport unit, e.g., a transport unit including a climate control system, may be used to transport perishable items including, but not limited to, produce, frozen foods, meat products, dairy products, etc.

A climate control system is generally used to control one or more environmental conditions such as, but not limited to, temperature, humidity, and/or air quality of a transport unit. A climate control system may include, for example, one or more of a refrigeration system to control the refrigeration of a climate controlled space of a refrigerated transport unit; a vapor-compressor type refrigeration system, a thermal accumulator type system, or any other suitable refrigeration system that may use refrigerant, cold plate technology, etc.

A climate control system may further include a climate control unit (CCU) attached to a transport unit to control one or more environmental conditions (e.g., temperature, humidity, air quality, etc.) of a climate controlled space of the refrigerated transport unit. The CCU may include, without limitation, one or more of a compressor, a condenser, an expansion valve, an evaporator, and one or more fans or blowers to control the heat exchange between the air within the climate controlled space and the ambient air outside of the refrigerated transport unit.

FIGS. 1A-1D show various transport climate control systems. FIG. 1A is a side view of a van 100 with a transport climate control system 105, in accordance with one or more embodiments described and recited herein. FIG. 1B is a side view of a truck 150 with a transport climate control system 155, in accordance with one or more embodiments described and recited herein. FIG. 1C is a perspective view of a climate controlled transport unit 200 attachable to a tractor 205, in accordance with one or more embodiments described and recited herein. FIG. 1D is a side view of a climate controlled transport unit 275 including a multi-zone transport climate control system 280, in accordance with one or more embodiments described and recited herein. It will be appreciated that the embodiments described are not limited to the transport units shown in FIGS. 1A-1D, but may apply to any type of transport unit (e.g., a truck, a container (such as a container on a flat car, an intermodal container, a marine container, a rail container, etc.), a box car, a semi-tractor, a bus, or other similar transport unit), within the scope of the principles of this disclosure.

FIG. 1A depicts the van 100 having the climate control system 105 for providing climate control within a climate controlled space 110. The transport climate control system 105 includes a climate control unit (CCU) 115 that is mounted to a rooftop 120 of the van 100. In accordance with one or more embodiments described and recited herein, the CCU 115 may be a transport refrigeration unit.

The CCU 115 may include, among other components, a climate control circuit that connects, for example, a compressor, a condenser, an evaporator, and an expansion device (e.g., an expansion valve) to provide climate control within the climate controlled space 110. In some embodiments, the CCU 115 may include one or more fans or blowers (e.g., axial fan(s), centrifugal blower(s), etc.) to push air that has passed over the condenser out of the CCU 115. Also, in some embodiments, the CCU 115 may include one or more fans or blowers (e.g., axial fan(s), centrifugal blower(s), etc.) to blow conditioned air that has passed over the evaporator into the climate controlled space 110.

The transport climate control system 105 may also include a programmable climate controller 125 and one or more climate control sensors (not shown) that are configured to measure one or more parameters of the transport climate control system 105 (e.g., an ambient temperature outside of the van 100, an ambient humidity outside of the van 100, a compressor suction pressure, a compressor discharge pressure, a supply air temperature of air supplied by the CCU 115 into the climate controlled space 110, a return air temperature of air returned from the climate controlled space 110 back to the CCU 115, a humidity within the climate controlled space 110, etc.) and communicate the measured parameters to the climate controller 125. The one or more climate control sensors may be positioned at various locations outside the van 100 and/or inside the van 100 (including within the climate controlled space 110).

The climate controller 125 may be configured to control operation of the transport climate control system 105 including the components of the climate control circuit. The climate controller 115 may include a single integrated control unit 130 or may include a distributed network of climate controller elements 130, 135. The number of distributed control elements in a given network may depend upon the particular application of the principles of this disclosure. The measured parameters obtained by the one or more climate control sensors may be used by the climate controller 125 to control operation of the climate control system 105.

FIG. 1B depicts the climate-controlled straight truck 150 that includes the climate controlled space 160 for carrying cargo and the transport climate control system 155. The transport climate control system 155 includes a CCU 165 that is mounted to a front wall 170 of the climate controlled space 160. The CCU 165 may include, among other components, a climate control circuit that connects, for example, a compressor, a condenser, an evaporator, and an expansion device to provide climate control within the climate controlled space 160. In accordance with one or more embodiments described and recited herein, the CCU 165 may be a transport refrigeration unit.

In some embodiments, the CCU 165 may include an axial fan to push air that has passed over the condenser out of the CCU 165. Also, in some embodiments, the CCU 165 may include a centrifugal blower to blow conditioned air that has passed over the evaporator into the climate controlled space 160.

The transport climate control system 155 may also include a programmable climate controller 175 and one or more climate control sensors (not shown) that are configured to measure one or more parameters of the transport climate control system 155 (e.g., an ambient temperature outside of the truck 150, an ambient humidity outside of the truck 150, a compressor suction pressure, a compressor discharge pressure, a supply air temperature of air supplied by the CCU 165 into the climate controlled space 160, a return air temperature of air returned from the climate controlled space 160 back to the CCU 165, a humidity within the climate controlled space 160, etc.) and communicate climate control data to the climate controller 175. The one or more climate control sensors may be positioned at various locations outside the truck 150 and/or inside the truck 150 (including within the climate controlled space 160).

The climate controller 175 may be configured to control operation of the transport climate control system 155 including components of the climate control circuit. The climate controller 175 may include a single integrated control unit 175 or may include a distributed network of climate controller elements 175, 180. The number of distributed control elements in a given network may depend upon the particular application of the principles described herein. The measured parameters obtained by the one or more climate control sensors may be used by the climate controller 175 to control operation of the climate control system 155.

FIG. 1C illustrates one embodiment of the climate controlled transport unit 200 attached to a tractor 205. The climate controlled transport unit 200 includes a transport climate control system 210 for a transport unit 215. The tractor 205 is attached to and may be configured to tow the transport unit 215. The transport unit 215 shown in FIG. 1C is a trailer.

The transport climate control system 210 may include, among other components, a CCU 220 that provides environmental control (e.g. temperature, humidity, air quality, etc.) within a climate controlled space 225 of the transport unit 215. The CCU 220 is disposed on a front wall 230 of the transport unit 215. In at least one or more other embodiments, the CCU 220 may be disposed, for example, on a rooftop or another wall of the transport unit 215. The CCU 220 includes a climate control circuit that connects, for example, a compressor, a condenser, an evaporator, and an expansion device to provide conditioned air within the climate controlled space 225. In accordance with one or more embodiments described and recited herein, the CCU 220 may be a transport refrigeration unit.

In some embodiments, the CCU 220 may include an axial fan to push air that has passed over the condenser out of the CCU 220. Also, in some embodiments, the CCU 220 may include a centrifugal blower to blow conditioned air that has passed over the evaporator into the climate controlled space 225.

The transport climate control system 210 may also include a programmable climate controller 235 and one or more sensors (not shown) that are configured to measure one or more parameters of the transport climate control system 210 (e.g., an ambient temperature outside of the transport unit 215, an ambient humidity outside of the transport unit 215, a compressor suction pressure, a compressor discharge pressure, a supply air temperature of air supplied by the CCU 220 into the climate controlled space 225, a return air temperature of air returned from the climate controlled space 225 back to the CCU 220, a humidity within the climate controlled space 225, etc.) and communicate climate control data to the climate controller 235. The one or more climate control sensors may be positioned at various locations outside the transport unit 200 and/or inside the transport unit 200 (including within the climate controlled space 225).

The climate controller 235 may be configured to control operation of the transport climate control system 210 including components of the climate control circuit. The climate controller 235 may include a single integrated control unit 240 or may include a distributed network of climate controller elements 240, 245. The number of distributed control elements in a given network may depend upon the particular application of the principles described herein. The measured parameters obtained by the one or more climate control sensors may be used by the climate controller 235 to control operation of the climate control system 210.

FIG. 1D illustrates an embodiment of the climate controlled transport unit 275. The climate controlled transport unit 275 includes the multi-zone transport climate control system (MTCS) 280 for a transport unit 285 that may be towed, for example, by a tractor (not shown). It will be appreciated that the embodiments described herein are not limited to tractor and trailer units, but may apply to any type of transport unit (e.g., a truck, a container (such as a container on a flat car, an intermodal container, a marine container, a rail container, etc.), a box car, a semi-tractor, a bus, or other similar transport unit), etc.

The MTCS 280 includes a CCU 290 and a plurality of remote units 295 that provide environmental control (e.g. temperature, humidity, air quality, etc.) within a climate controlled space 300 of the transport unit 275. The climate controlled space 300 may be divided into a plurality of zones 305. The term "zone" means a part of an area of the climate controlled space 300 separated by walls 310. The CCU 290 may operate as a host unit and provide climate control within a first zone 305a of the climate controlled space 300. The remote unit 295a may provide climate control within a second zone 305b of the climate controlled space 300. The remote unit 295b may provide climate control within a third zone 305c of the climate controlled space 300. Accordingly, the MTCS 280 may be used to separately and independently control environmental condition(s) within each of the multiple zones 305 of the climate controlled space 300.

The CCU 290 is disposed on a front wall 315 of the transport unit 275. In one or more other embodiments, the CCU 290 may be disposed, for example, on a rooftop or another wall of the transport unit 275. The CCU 290 includes a climate control circuit that connects, for example, a compressor, a condenser, an evaporator, and an expansion device to provide conditioned air within the climate controlled space 300. The remote unit 295a is disposed on a ceiling 320 within the second zone 305b and the remote unit 295b is disposed on the ceiling 320 within the third zone 305c. Each of the remote units 295a and 295b includes an evaporator that connects to the rest of the climate control circuit provided in the CCU 290. In accordance with one or more embodiments described and recited herein, the CCU 290 may be a transport refrigeration unit.

In some embodiments, the CCU 290 may include an axial fan to push air that has passed over the condenser out of the CCU 290. Also, in some embodiments, the CCU 290 may include a centrifugal blower to blow conditioned air that has passed over the evaporator into the climate controlled space 300.

The MTCS 280 may also include a programmable climate controller 325 and one or more climate control sensors (not shown) that are configured to measure one or more parameters of the MTCS 280 (e.g., an ambient temperature outside of the transport unit 275, an ambient humidity outside of the transport unit 275, a compressor suction pressure, a compressor discharge pressure, supply air temperatures of air supplied by the CCU 290 and the remote units 295 into each of the zones 305, return air temperatures of air returned from each of the zones 305 back to the respective CCU 290 or remote unit 295a or 295b, a humidity within each of the zones 305, etc.) and communicate climate control data to a climate controller 325. The one or more climate control sensors may be positioned at various locations outside the transport unit 275 and/or inside the transport unit 275 (including within the climate controlled space 300).

The climate controller 325 may be configured to control operation of the MTCS 280 including components of the climate control circuit. The climate controller 325 may include a single integrated control unit 330 or may include a distributed network of climate controller elements 330, 335. The number of distributed control elements in a given network may depend upon the particular application of the principles described herein. The measured parameters obtained by the one or more climate control sensors may be used by the climate controller 325 to control operation of the MTCS 280.

FIG. 2 is a schematic diagram of a climate control circuit 400, according to at least one or more embodiments described and recited herein. The climate control circuit 400 generally includes a compressor 405, a condenser 410, an expansion device 415, and an evaporator 420. The compressor 405 may be, for example, a scroll compressor, a reciprocal compressor, etc. In some embodiments, the compressor 405 may be a mechanically driven compressor. In one or more other embodiments, the compressor 405 may be an electrically driven compressor.

The climate control circuit 400 is exemplary and may be modified to include additional components. For example, in some embodiments the climate control circuit 400 may include an economizer heat exchanger, one or more flow control devices (e.g., valves, etc.), a receiver tank, a dryer, a suction-liquid heat exchanger, etc.

The climate control circuit 400 may generally be applied in a variety of systems used to control an environmental condition (e.g., temperature, humidity, air quality, etc.) in a space (generally referred to as a climate controlled space). Examples of such systems may include, as non-limiting examples, the climate control systems shown and described above with regard to FIGS. 1A-1D.

The components of the climate control circuit 400 may be fluidly connected. The climate control circuit 400 may be configured to be a cooling system (e.g., an air conditioning system) capable of operating in a cooling mode. Alternatively, the climate control circuit 400 may be configured as a heat pump system, capable of operating in either a cooling mode or a heating mode.

Climate control circuit 400 may be configured to heat or cool heat transfer fluid or medium (e.g., a gas), in which case the climate control circuit 400 may be generally representative of an air conditioner or heat pump.

In operation, the compressor 405 compresses a heat transfer fluid (e.g., refrigerant, etc.) from a relatively lower pressure gas to a relatively higher-pressure gas. The relatively higher-pressure and higher temperature gas is discharged from the compressor 405 and flows through the condenser 410. As is known, the heat transfer fluid flows through the condenser 10 and rejects heat to a heat transfer fluid or medium (e.g., air, etc.), thereby cooling the heat transfer fluid. The cooled heat transfer fluid, which is now in a liquid form, flows to the expansion device 415 (e.g., an expansion valve, etc.). The expansion device 415 reduces the pressure of the heat transfer fluid. As a result, a portion of the heat transfer fluid is converted to a gaseous form. The heat transfer fluid, which is now in a mixed liquid and gaseous form flows to the evaporator 420. The heat transfer fluid flows through the evaporator 420 and absorbs heat from a heat transfer medium (e.g., air, etc.), heating the heat transfer fluid, and converting it to a gaseous form. The gaseous heat transfer fluid then returns to the compressor 405. The above-described process continues while the heat transfer circuit is operating, for example, in a cooling mode (e.g., while the compressor 405 is enabled).

In accordance with at least one embodiment, a centrifugal blower may be configured to facilitate heat exchange by blowing air passing over the evaporator 420 into a climate controlled space. Also, the condenser 410 can be combined with an axial fan that is configured to facilitate heat exchange by pushing air passing over the condenser 410 out of a CCU.

Figure 3:
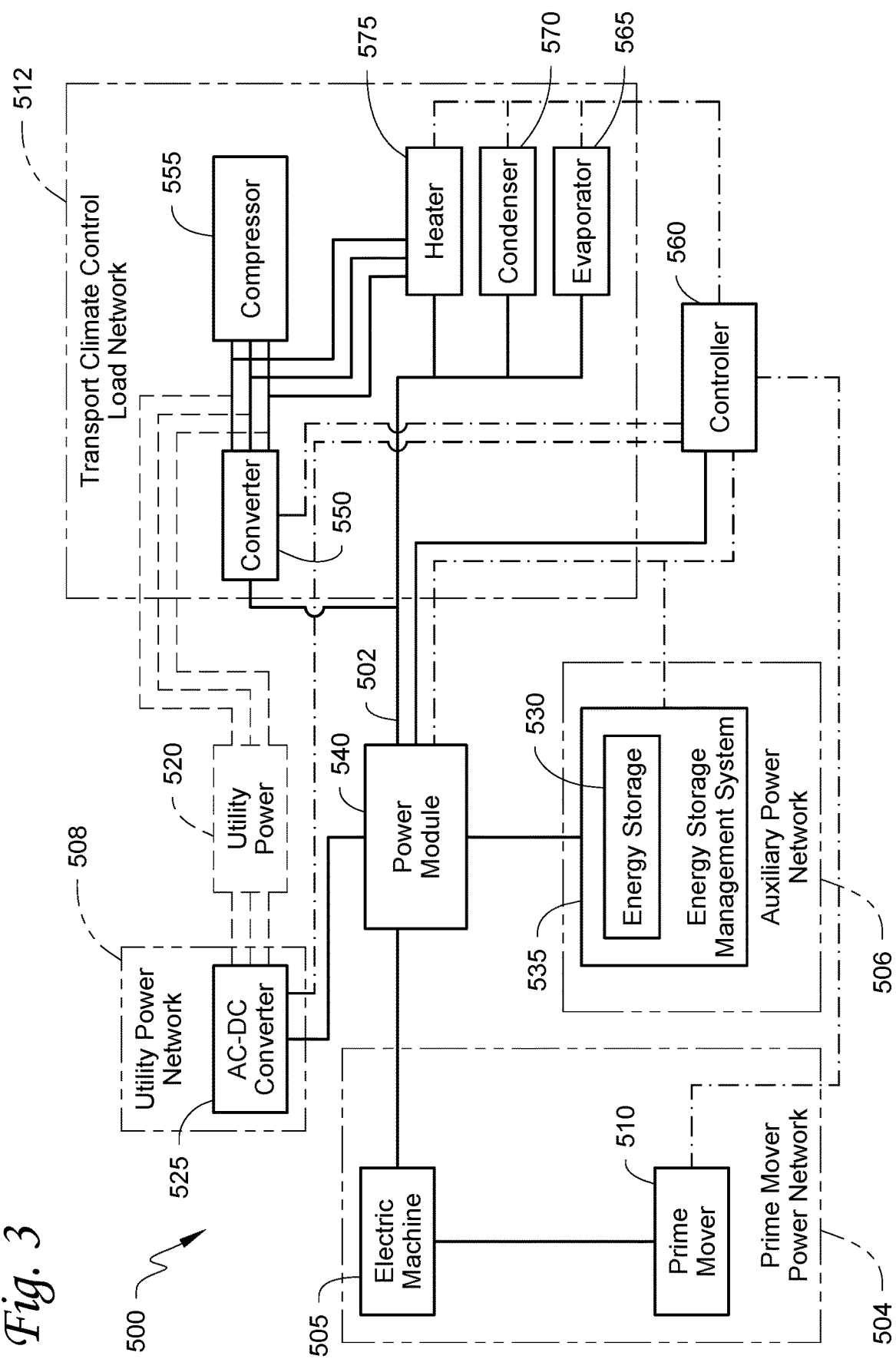
FIG. 3 shows a block diagram of a power system for powering a transport climate control system, according to at least one embodiment described and recited herein.

FIG. 3 illustrates a block diagram schematic of one embodiment of a power system 500 for powering a transport climate control system (e.g., the transport climate control systems 105, 155, 210, 280 shown in FIGS. 1A-1D). The power system 500 includes a prime mover power network 504, an auxiliary power network 506, a utility power network 508, and a transport climate control load network 512 connected to a power module 540. In accordance with one or more alternative embodiments, the power system 500 may include one or more of the prime mover power network 504, the auxiliary power network 506, and/or the utility power network 508. For example, in at least one embodiment, the power system 500 includes the prime mover power network 504, without the auxiliary power network 506 and/or the utility power network 508. In at least one other embodiment, the power system 500 includes the prime mover power network 504 and the utility power network 508, without the auxiliary power network 506. The power system 500 may use one or more of the prime mover power network 504, the auxiliary power network 506 and the utility power network 508 at any given time to provide power to the transport climate control load network 512. While the power system 500 may be configured to be a hybrid power system that is powered by the prime mover power network 504 in combination with the auxiliary power network 506 and/or the utility power network 508. However, the embodiments described herein may be used with a fully electric power system that does not include a prime mover or prime mover power network to provide power to the transport climate control system.

The prime mover power network 504 includes a prime mover 510 and an electric machine 505 that may provide electric power to the power module 540. The prime mover 510 may be configured to generate mechanical power and the electric machine 510 may be configured to convert the mechanical power to electric power. The generated electric power is then sent by the prime mover power network 505 to the power module 540. In some embodiments, the prime mover 510 may be a vehicle prime mover used to move the vehicle that also provides power to the transport climate control load network 512 when available. Mechanical power generated by the prime mover 510 that may be used in the system 500 may be inconsistent and based on operation and vehicle load requirements of the vehicle. In other embodiments, the prime mover 510 and the electric machine 505 may be part of a generator set that provides power to the transport climate control load network 512. In yet further embodiments, the prime mover 510 and the electric machine 505 may be part of a CCU (e.g., the CCU 115, 165, 220, 290 shown in FIGS. 1A-D) to provide power to the transport climate control load network 512. In some embodiments the maximum power available from the prime mover power network 504 may never be sufficient to operate the transport climate control system operating at a full capacity.

In some embodiments, the electric machine 505 may be an electrical generator that may provide DC power to the transport climate control load network 512. In other embodiments, the electric machine 505 may include an alternator and a rectifier or an AC-DC converter (not shown) that rectifies or converts the AC power generated by the electric machine 505 to a DC power.

For an electric vehicle, there may be no prime mover 510. The electric machine 505 may be a motor generator that is used with a high voltage (e.g., in a range between 60V and 1500V; for example 400V, 800V, etc.) DC battery to run the vehicle. Electric vehicles may also provide a relatively high voltage (e.g., 400V, 800V, etc.) DC power source (e.g., a battery pack, a rechargeable energy storage system (RESS), etc.). Electric vehicles may include one or more DC-DC converters (e.g., two DC-DC convertors) to convert the relatively high voltage (e.g., 400V, 800V, etc.) to a low voltage (e.g., in a range between 0V and 60V; for example 12V). That is, the electric machine 505 may be replaced with a DC-DC converter having similar parameters as the electric machine 505 in order to be able to provide prime mover network power to the power module 540.

In some embodiments, the electric machine 505 may provide a low voltage (e.g. 12V) from the prime mover power network 504 to the power module 540 for powering the transport climate control load network 512. In other embodiments, an electric vehicle may provide for example, 7 kW-Hour energy from a 45 kW-Hour storage of the prime mover power network 504 to the power module 540 to run the transport climate control load network 512. In still further embodiments, the prime mover power network 504 may use take off power (e.g., electric power take off or ePTO) from the low voltage (for example, 12V) system for loads such as the power module 540. The high voltage power may provide power for driving the vehicle (e.g., transmission power take off) and the power system 500 but may not take electric power from the high voltage system.

For a hybrid vehicle, there may be a machine (such as the electric machine 505) and/or a low voltage DC power source that may provide a low voltage (e.g., 12V) to the power module 540.

Any type of power source may provide power to the power system 500 and may be part of the prime mover power network 504. This may include, for example, the electric machine 505, a battery, a RESS, a generator, an axle-mounted generator, a power take off (PTO) device or ePTO device with an auxiliary converter, etc.

The auxiliary power network 506 includes an energy storage source 530 and an energy storage management system 535. In some embodiments, the auxiliary power network 506 may be part of the transport climate control system and potentially housed within a CCU. In other embodiments, the auxiliary power network 506 may be external to the transport climate control system and part of the prime mover power network 504. In yet further embodiments, the auxiliary power network 506 may be external to the transport climate control system and external to the prime mover power network 504.

In some embodiments, the energy storage source 530 may include one or more batteries. For example, in at least one embodiment the energy storage source 530 may include two batteries (not shown). Each battery may also be connected to the power module 540. The energy storage source 530 may provide sufficient energy to power the transport climate control load network 512 by itself. In some embodiments, the energy storage source 530 may provide 12 VDC or 24 VDC. In other embodiments, the energy storage source 530 may provide 48 VDC.

The energy storage management system 535 may be configured to monitor a charge level of one or more batteries of the energy storage source 530 and charge the one or more batteries of the energy storage source 530. The energy storage management system 535 may communicate with, for example, the controller 560 and/or a controller (not shown) of the power module 540 to provide a charge level of one or more batteries of the energy storage source 530. Also, the energy storage management system 535 may receive instructions from, for example, the controller 560 and/or the controller of the power module 540 indicating the amount of power from the energy storage source 530 should be supplied to the power module 540.

In other embodiments, the energy storage management system 535 may be configured to monitor other parameters (e.g., monitor the fuel levels for an engine-driven system) and communicate the monitored data with, for example, the controller 560 and/or a controller (not shown) of the power module 540.

The power module 540 may be configured to convert a power from both of the prime mover power network 504 and the auxiliary power network 506 to a load power compatible with one or more loads of the transport climate control load network 512. The power module 540 may include a high power module (not shown) and a low power module (not shown) that is discussed in more detail below. That is, the power module 540 may be configured to buck or boost power from the prime mover power network 504 and may be configured to buck or boost power from the auxiliary power network 506 to obtain the desired load power. In accordance with at least some embodiments described and recited herein, the power module 540 may include one or more DC/DC converters. For example, the power module 540 may include one DC/DC converter to convert the power generated by the prime mover power network 504 and/or the auxiliary power network 506 to a voltage compatible with one or more loads of the transport climate control load network 512 and a second DC/DC converter to convert the auxiliary network power to a voltage compatible with one or more loads of the transport climate control load network 512. The converted power from the prime mover power network 504 and the converted power from the auxiliary power network 506 are combined to obtain a load power compatible with one or more loads of the transport climate control load network 512. The load power outputted by the power module 540 may then be provided on a load DC bus 502 to the transport climate control load network 512. In at least one or more embodiments, the load power may be a low voltage DC power (e.g., between 0-60V DC). In other alternative embodiments, the load power may be a high voltage DC power (e.g., between 60-1500V DC).

In accordance with at least some embodiments described and recited herein, the power module 540 may include a controller (not shown) configured to monitor and control the power module 540. In some alternative embodiments, the controller may communicate with the controller 560.

The power system 500, and particularly the power module 540, is controlled by the controller 560 of the transport climate control load network 512. The controller 560 may be, for example, the controller 125, 175, 235, 325 shown in FIGS. 1A-D. In some embodiments described and recited herein, the power module 540 may monitor the amount of current and/or voltage provided by the prime mover power network 504. Also, in at least some alternative embodiments, the power module 540 may monitor the amount of current and/or voltage drawn by components of the transport climate control load network 512. The power module 540 may be configured to communicate the amount of current and/or voltage provided by the prime mover power network 504 and the amount of current and/or voltage drawn by components of the transport climate control load network 512.

Components of the transport climate control load network 512 may be, for example, part of a CCU that is mounted to the body of the vehicle (for example, truck, van, etc.). In some embodiments, the CCU may be above the cab of the truck (as shown in FIG. 1B). In one or more alternative embodiments, the CCU may be on the top of the TU (for example, a top of a box where the external condensers are located) (see FIG. 1C). In one or more other embodiments, the components of the transport climate control load network 512 may be DC powered components. In one or more other embodiments, the components of the transport climate control load network 512 may be AC powered components. Alternatively, the transport climate control load network 512 may include both DC powered components and AC powered components.

As shown in FIG. 3, the transport climate control load network 512 includes at least one compressor 555, one or more evaporator blowers 565, one or more condenser fans 570, the heater 575, and the controller 560. It will be appreciated that in some embodiments, the transport climate control load network 512 does not include the heater 575. It will also be appreciated that in some embodiments, the transport climate control load network 512 does not include the at least one compressor 555. It will further be appreciated that in some embodiments, the transport climate control load network 512 may include thermal management of batteries, power electronics, etc. The transport climate control load network 512 also includes an inverter 550 that may be configured to boost the load power and convert the boosted load power to an AC load power. That is, the inverter 550 may be configured to boost power from the DC load bus 502 and converts the power to AC power to drive the compressor 555. In some embodiments, the inverter 550 may convert the load power to a high voltage AC power. As shown in FIG. 3, the inverter 550 may be configured to power the compressor 555 and optionally the heater 575. It will be appreciated that in other embodiments, the inverter 550 may power other components of the transport climate control load network 512 such as, for example, the one or more evaporator blowers 565, the one or more condenser fans 570, etc. In some embodiments, the inverter 550 may be a Compressor Drive Module (CDM). Details of an example of an axial fan that can be used as the condenser fan 570 is discussed in detail below with respect to FIGS. 4-7.

The load DC bus 502 is connected to and powers each of the inverter 550, the one or more evaporator blowers 565, the one or more condenser fans 570, the heater 575, and the controller 560. It will be appreciated that the inverter 550 with the compressor 555 may require the most power of the various loads of the transport climate control load network 512. As shown in FIG. 3, in some embodiments, the inverter 550 may also power the heater 575.

The utility power network 508 may be configured to charge the energy storage source 530 of the auxiliary power network 506 when, for example, the vehicle is parked and has access to a utility power source 520. In some embodiments, the utility power network 508 may also provide power to operate the transport climate control load network 512 when, for example, the vehicle is parked and has access to a utility power source. The utility power network 508 includes the AC-DC converter 525. The utility power source (e.g., shore power, etc.) 520 may be connected to the AC-DC converter 525 to provide AC power input to the AC-DC converter 525. The AC-DC converter 525 may be configured to convert the AC power from the utility power source 520 and to provide converted DC power to the power module 540.

While FIG. 3 shows a single AC-DC converter 525 as part of the utility power network 508, the power system 500 may include two or more AC-DC converters. In embodiments in which there are two or more AC-DC converters, each of the AC-DC converters may be connected to the utility power 520 to provide additional power capacity to the power system 500. In some embodiments, each of the AC-DC converters may provide different amounts of power. In some embodiments, each of the AC-DC converters may provide the same amount of power.

In one or more alternative embodiments, the utility power 520 may be connected directly to the compressor 555 and provide power to drive the compressor 555 thereby bypassing the inverter 550. In one or more other embodiments, the inverter 550 may be used as an AC-DC converter and convert power received from the utility power 520 into DC power that may be provided by the inverter 550 to the load DC bus 502.

In some embodiments, the compressor 555 may be a variable speed compressor. In other embodiments, the compressor 555 may be a fixed speed (e.g., two-speed) compressor. Also, in some embodiments, the heater 575 may be configured to receive power from the inverter 550. While the compressor 555 shown in FIG. 3 is powered by AC power, it will be appreciated that in other embodiments the compressor 555 may be powered by DC power or mechanical power. Further, in some embodiments, the prime mover 510 may be directly connected (not shown) to the compressor 555 to provide mechanical power to the compressor 555.

When the compressor 555 and/or the heater 575 are powered directly by the utility power 520, the compressor 555 and/or the heater 575 may be turned on and off (e.g., operate in a start/stop mode) in order to control the amount of cooling provided by the compressor 555 and/or the amount of heating provided by the heater 575.

The controller 560 may be configured to monitor and control operation of the transport climate control system. In particular, the controller 560 may control operation of the compressor 555, the heater 575, the one or more condenser fans 570, the one or more evaporator blowers 565 and any other components of the vehicle powered transport climate control system. In some embodiments, the controller 560 may monitor the amount of power drawn by the components of the transport climate control load network 512. The controller 560 may also be configured to control the power system 500. The power system 500 may also include one or more sensors (not shown) that are configured to measure one or more power parameters (e.g., voltage, current, etc.) throughout the power system 500 and communicate power parameter data to the controller 560. As shown in FIG. 3, the controller 560 may communicate with all of the components of the transport power system 500 via a communication link.

In accordance with one or more embodiments described and recited herein, the controller 560 may be a distributed controller that includes a main application controller (part of the controller 560), a human machine interface (not shown), a telematics unit (not shown), and the power module 540. As noted above, in some embodiments, the power module 540 may include a high power module and a low power module. It will be appreciated that the high power module, the low power module, the main application controller, the telematics unit and the human machine interface may communicate via one or more communication links using one or more protocols including, for example a Controller Area Network (MAY) communication protocol, RS232 communication protocol, RS485 communication protocol, Bluetooth communication protocol, etc. In some embodiments, the controller 560 may also include other modules including, for example, a telematics unit that may provide wireless network connectivity (e.g., cellular, Bluetooth, etc.) that allows the transport climate control system to be controlled remotely.

Figure 4A:
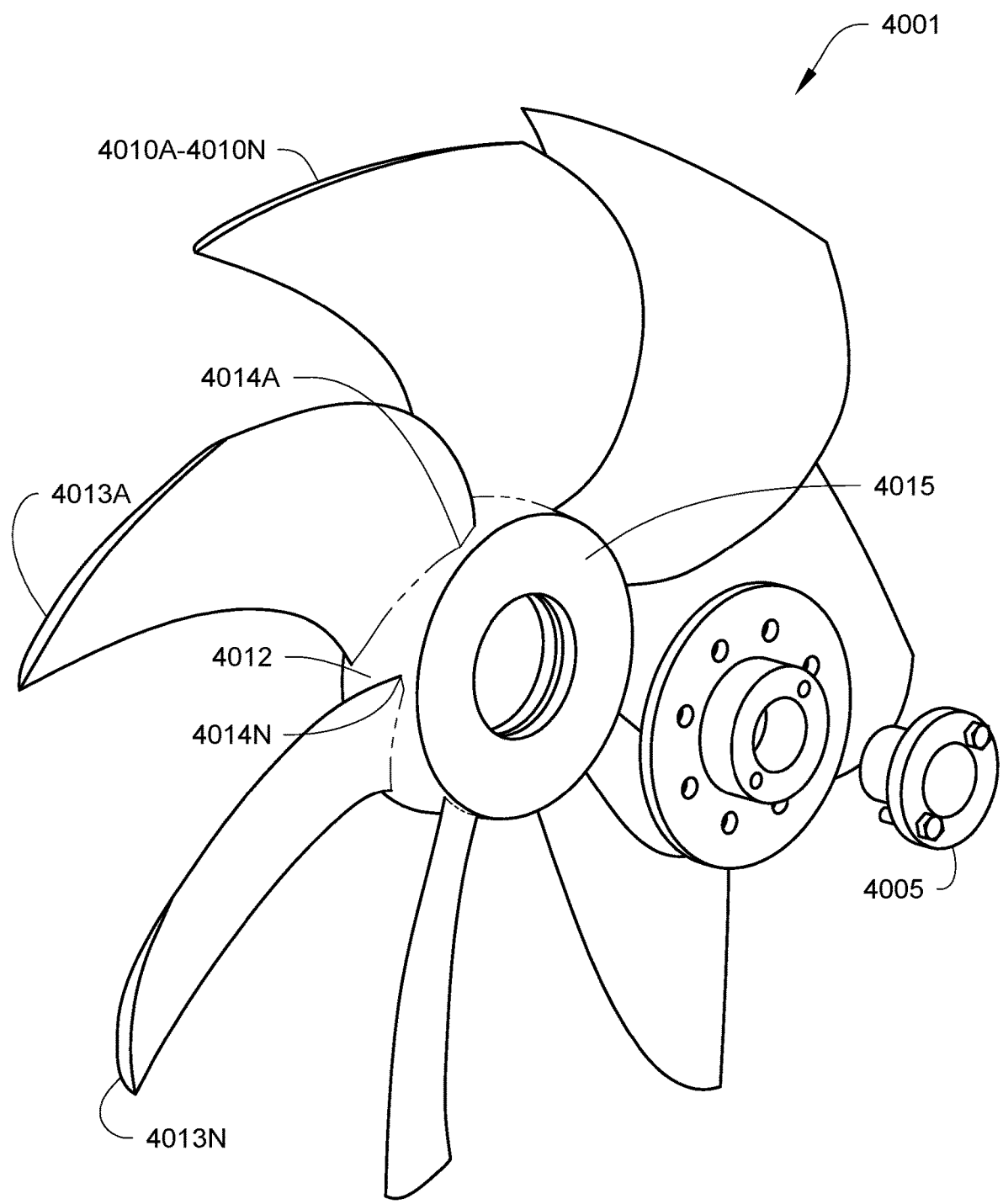
FIG. 4A shows of components of a condenser fan from a front view, according to at least one embodiment described and recited herein.

FIG. 4A shows of components of an axial fan 4001 (that can be used, for example, as the condenser fan 570 shown in FIG. 3) from a front view, according to at least one embodiment described and recited herein.

Figure 4B:
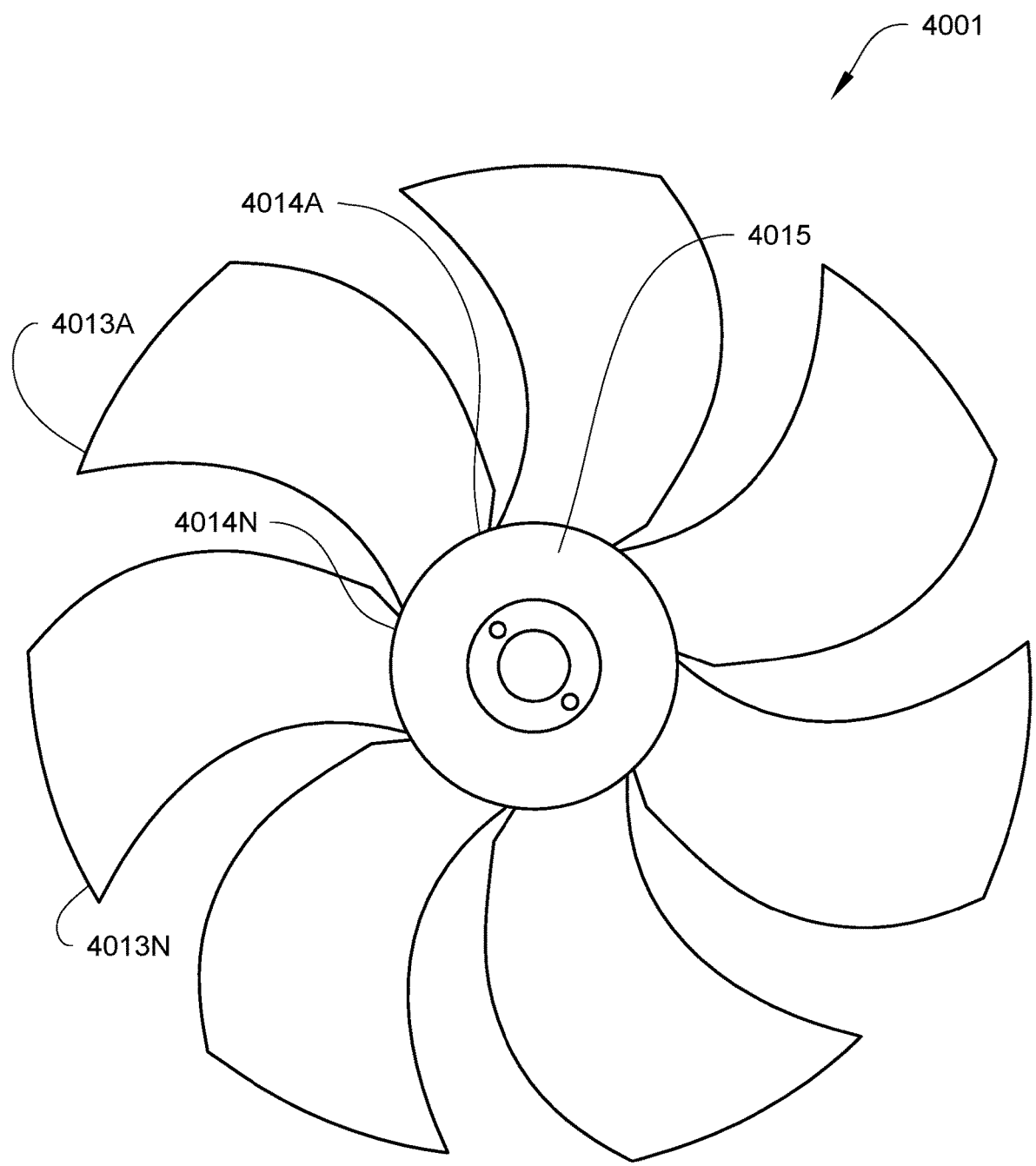
FIG. 4B shows components of a condenser fan from a planar, according to at least one embodiment described and recited herein.

FIG. 4B shows components of the axial fan 4001 from a planar, according to at least one embodiment described and recited herein.

In accordance with at least one example embodiment described and recited herein, the axial fan 4001 includes bushing 4005, blades 4010A-4010N, and lock hub 4015.

Bushing 4005 may refer to a taper lock bushing that facilitates installation and access to tightening bolts to secure condenser fan blades 4010A-4010N within condenser fan 570.

Blades 4010A-4010N, which may be uniformly configured, may be composed of metal, plastic, or other composite material. The number of blades for a given embodiment may vary, hence the blades may be removably fastened thereto. The embodiments described, recited, and even contemplated by the description herein may include anywhere between 3-10 blades, though 10 blades is not to be interpreted as a definitive limitation. The number of blades is not bounded.

The variable configuration of fan blades 4010A-4010N enables condenser fan 570 to operate within a uniform or even standardized casing for, e.g., condenser 410 (see FIG. 2). Accordingly, the axial fan 4001, as described and recited herein, may operate at operating speeds that are lower than those of typical or currently known implementations while generating an airflow that meets or even exceeds those of the typical or currently known implementations.

Hub 4015 may be included in an integrated hub design by which a boss accommodates bushing 4005 to secure condenser fan blades 4010A-4010N.

Manufacturing of a non-limiting example of axial fan 4001 may blade component 4010A-4010N being produced by simple injection molding around hub 4015. Such an integrated hub design includes a boss to accommodate bushing 4005, thus facilitating easy installation of the assembly and access to tightening bolts.

The injection molding process for axial fan 4001 produces a one piece design with several, e.g., five to seven, fan blades 4010A-4010N, in such close proximity that, from a planar front or rear view, it appears that a leading edge 4013A of each respective blade overlaps a trailing edge 4014N of a blade that is in closest proximity to leading edge 4013A (see FIG. 4B). Injection molding is just one example of molding processes by which axial fan 4001 may be produced, and therefore the embodiments described, recited, and even contemplated herein are not so limited. For example, the molding process may include various casting processes, e.g., 3D-printing. Further, it is well understood that manufacturing processes are being refined and improved on a consistent basis. Therefore, the manufacturing process for axial fan 4001 is not to be interpreted as a limiting feature for the embodiments described, recited, and even contemplated herein.

That is, from a front view, a stacking line or stacking plane, may extend from the center of the hub to the tip of the respective blade; and the view from the vertical plane may be regarded as the stacking plane. Accordingly, when viewed from a stacking plane of any of the blades, a leading edge, e.g., 4013A, may cross the stacking plane perpendicular to hub 4015 and extend to overlap trailing edge 4014N.

However, as shown in the view of FIG. 4A, in accordance with a non-limiting example, a separation or gap 4012 exists between respective blades 4010A—4010N. That is, there is no connection between a stem of each of the respective blades, the stem being points of connection or attachment for each of the respective blades to the hub. Accordingly, axial fan 4001 may be manufactured by a simple injection molding process by which each of fan blade 4010 is molded onto hub 4015 in a secure manner, but also configured to provide advantageous and efficient airflow by the entirety of axial fan 4001.

Further, in accordance with at least some examples, the hub and blades may be molded by a common molding or casting process.

As an example of the more efficient and advantageous propulsion, the one-piece axial design of axial fan 4001 may result in an increase in efficiency of approximately ~23% compared to known implementations, and therefore may be appropriate for forward-looking energy efficient platforms.

Figure 5A:
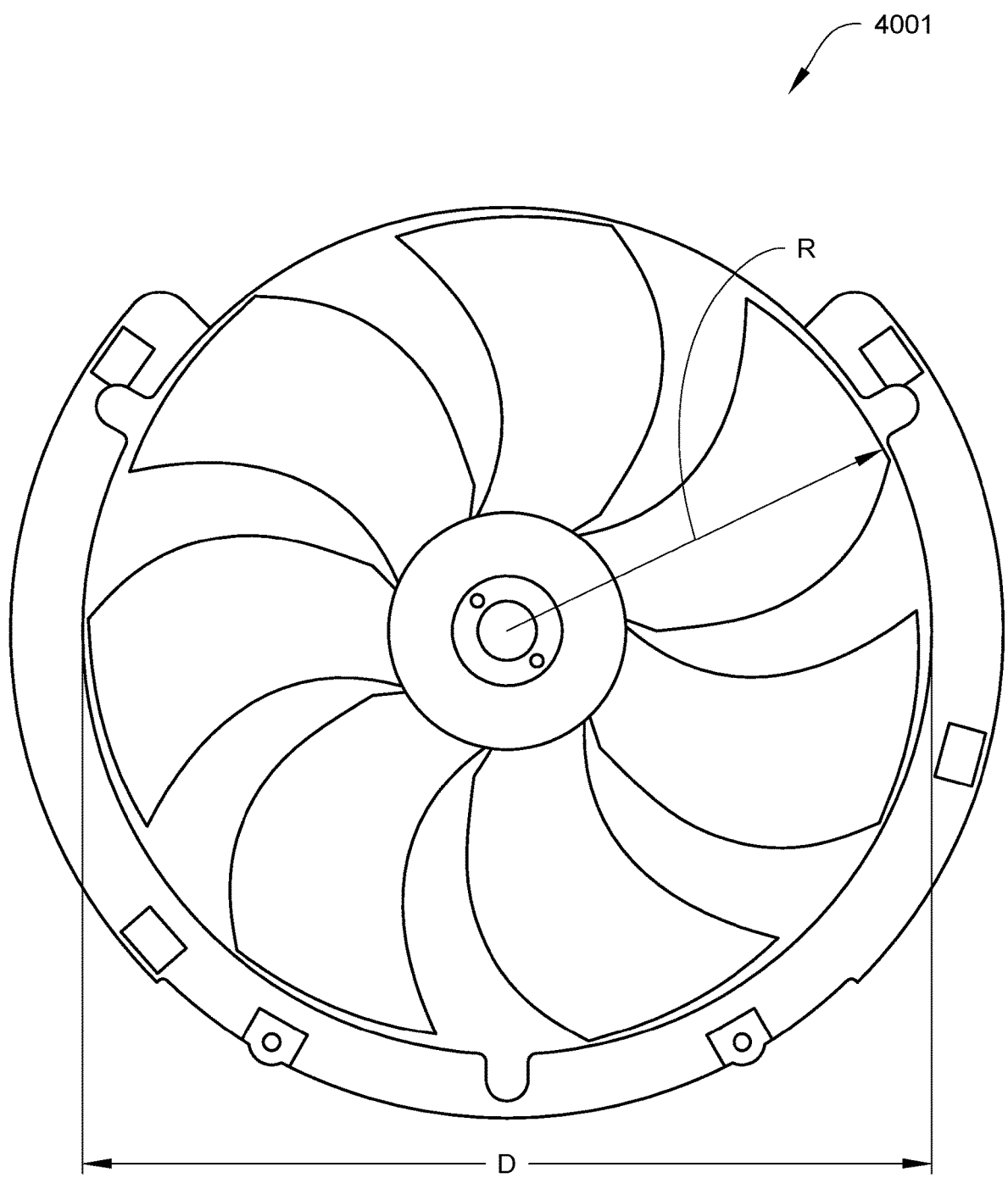
FIG. 5A shows a front view of a condenser fan, according to at least one embodiment described and recited herein.

FIG. 5A shows a front view of an axial fan 4002, according to at least one embodiment described and recited herein.

Figure 5B:
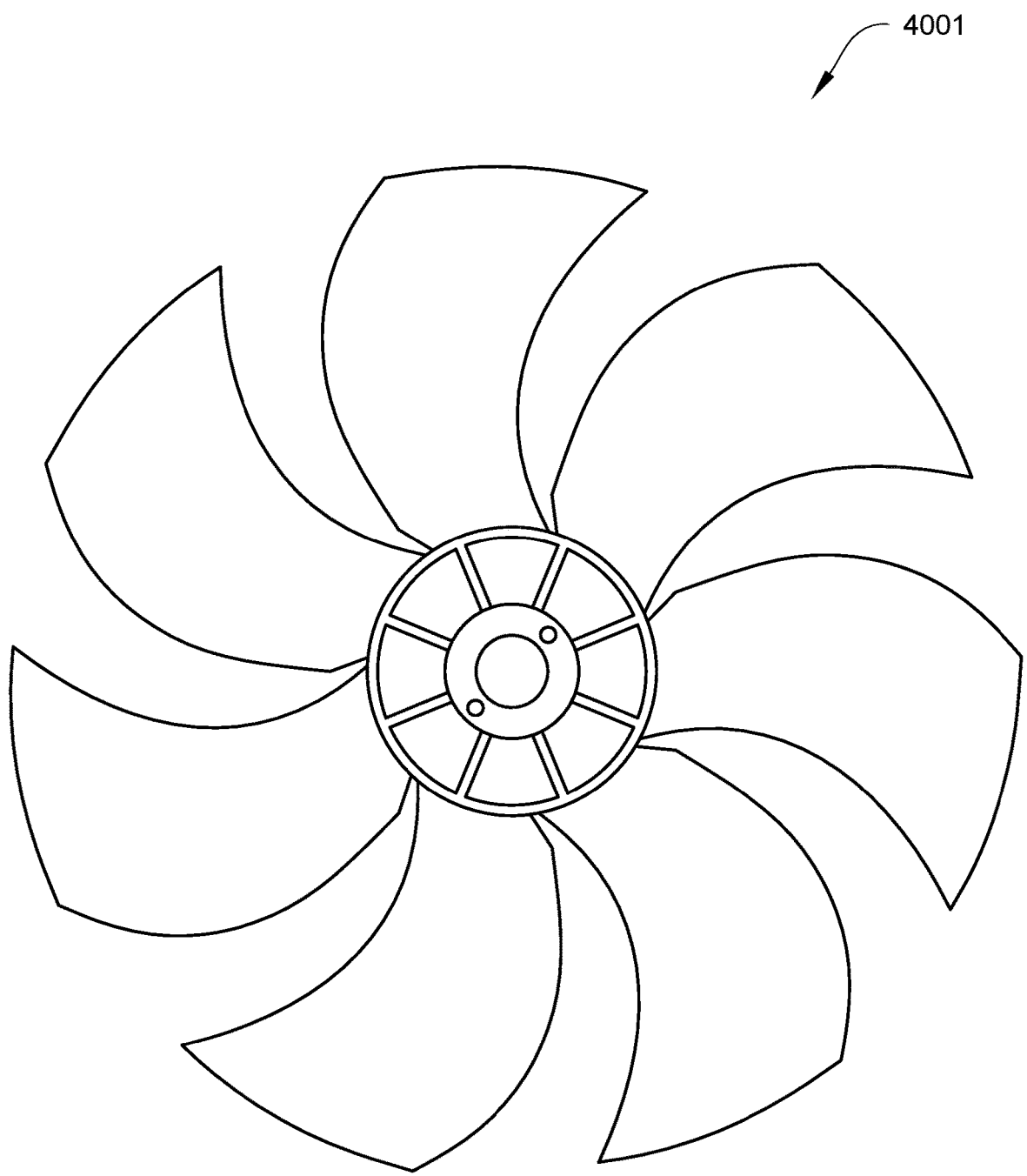
FIG. 5B shows a rear view of a condenser fan, according to at least one embodiment described and recited herein.

FIG. 5B shows a review view of the axial fan 4002, according to at least one embodiment described and recited herein.

Figure 5C:
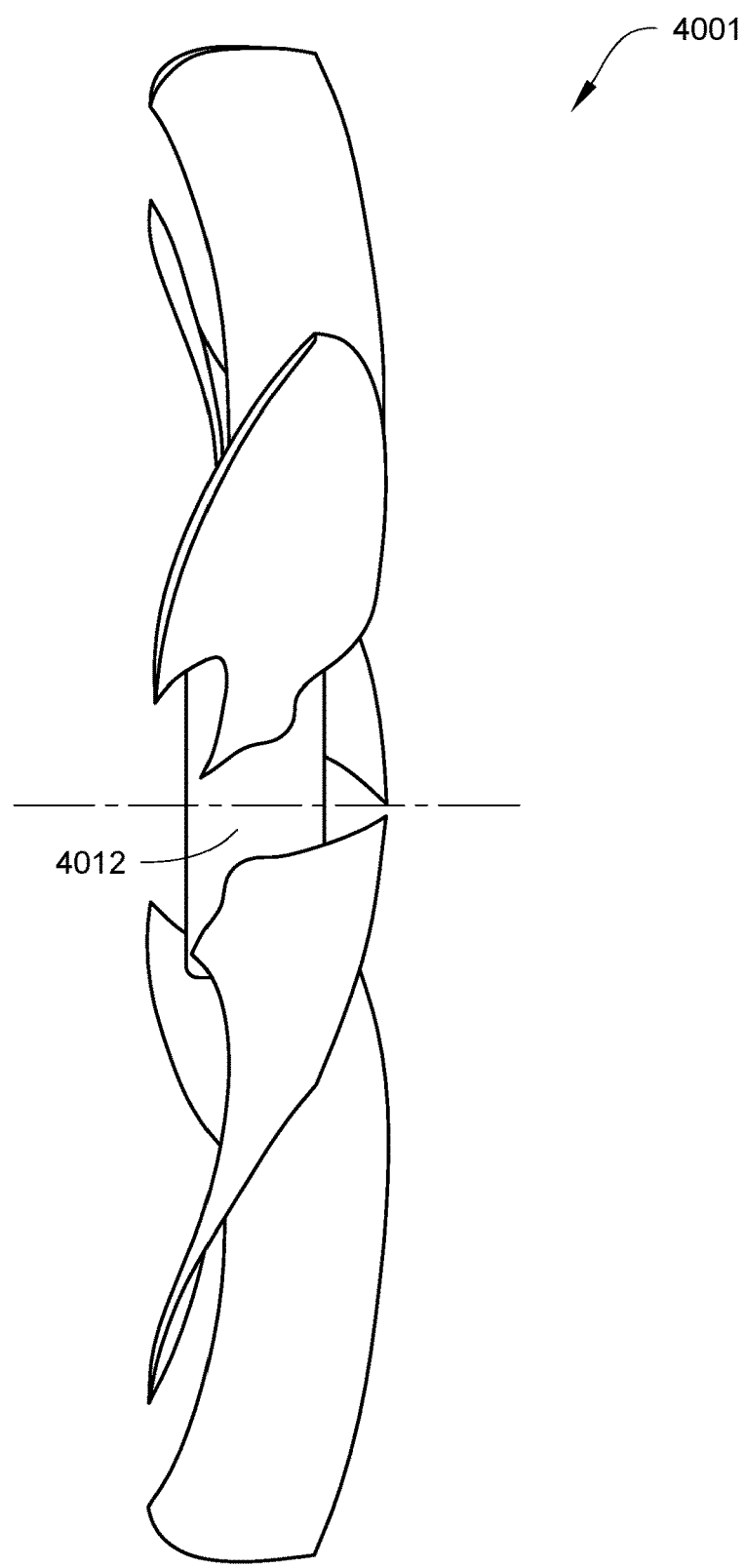
FIG. 5C shows a side view of a condenser fan, according to at least one embodiment described and recited herein.

FIG. 5C shows a side view of the axial fan 4002, according to at least one embodiment described and recited herein.

Figure 6A:
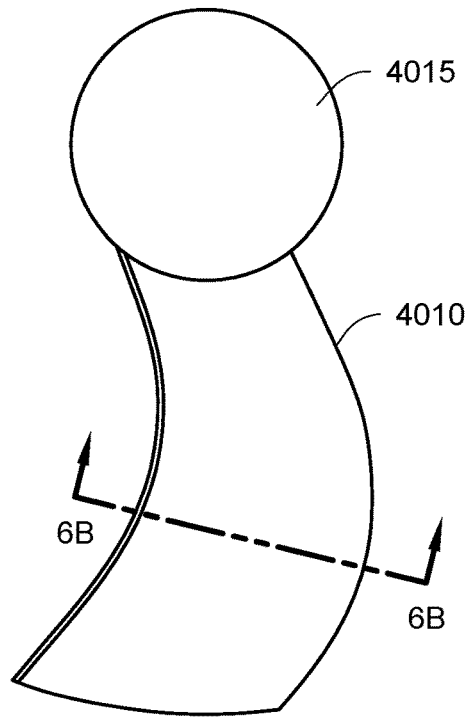
FIG. 6A shows a first perspective of a fan blade, according to at least one embodiment described and recited herein.

FIG. 6A shows a first perspective of a fan blade, according to at least one embodiment described and recited herein.

Figure 6B:
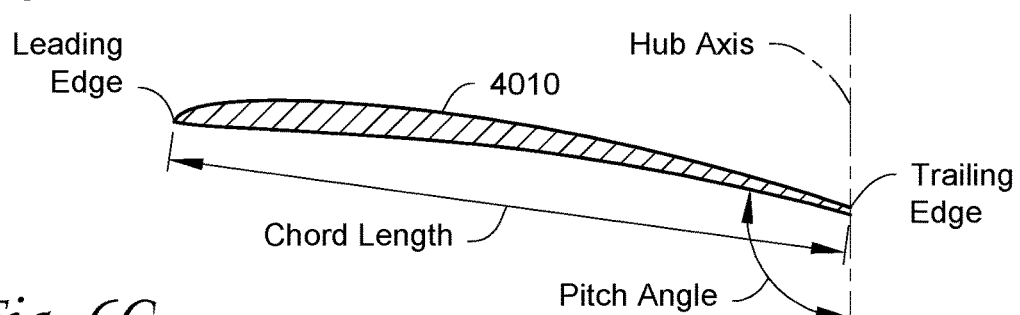
FIG. 6B shows a second perspective of a fan blade, according to at least one embodiment described and recited herein.

FIG. 6B shows a second perspective of a fan blade, according to at least one embodiment described and recited herein.

Figure 6C:
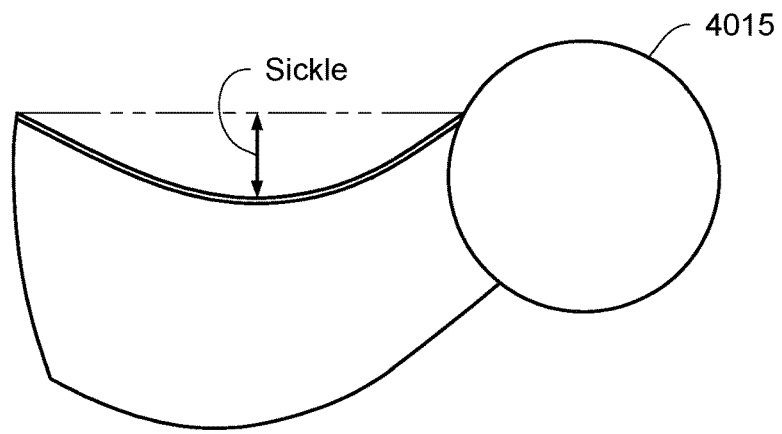
FIG. 6C shows a third perspective of a fan blade, according to at least one embodiment described and recited herein.

FIG. 6C shows a third perspective of a fan blade, according to at least one embodiment described and recited herein.

FIG. 7 shows an example configuration of a fan blade of an axial fan, according to at least one embodiment described and recited herein.

Each of blades 4010A-4010N, in accordance with at least one embodiment described and recited herein, may be composed of standard airfoil E63. As shown in FIG. 7, each blade may be profiled by six (6) different planes.

Variable components of each of blades 4010A-4010N, in accordance with the embodiments described and recited herein, may include: stacking plane, chord length, sickle percentage, and pitch.

As described and recited herein, blades may be designed by creating a hub center and determining a radius, or blade span, for each blade. As set forth above, from a front view, a stacking line or stacking plane, may extend from the center of the hub to the tip of the respective blade; and the view from the vertical plane may be regarded as the stacking plane. After determining a number of blade profile planes, a blade may be profiled at each plane, in terms of chord length, pitch angle, and sickle percentage. Then, after creating a hub for the blade, fillet for the trailing edge of the respective blades is filleted to maintain a minimum required thickness at the trailing edge. In addition, or alternatively, the trailing edge of the respective blades may be feathered or otherwise contoured to promote more efficient airflow, in accordance with refined manufacturing processes. Further, each blade may be trimmed near its leading edge to create a slant face, which provides an opening for manual or even mechanical adjustments.

Further, in accordance with at least some embodiments described and recited herein, a shroud may be provided to circumferentially surround the fan assembly.

As described and recited herein, a stacking plane may refer to a reference plane for development of the blade design, i.e., the reference plane by which all other planes are defined.

Chord length, as shown in FIG. 6, is described with regard to the distance between a leading edge to a trailing edge of an airfoil profile. Power performance and efficiency are proportional to chord length. That is, although increased chord length may result in increased ajr flow, increased chord length may also come with the cost of increased power requirements. Thus, an increase in chord length is tempered by other parameter metrics to increase flow while not incurring an increase in power cost.

Sickle percentage, as described and recited herein, may pertain to planes of the blade relative to the stacking plane. If a leading point of the blade is placed on the stacking plane, then the sickle percentage is zero. If the leading point of the blade is upstream to the stacking plane, then the sickle percentage is positive. If the leading point of the blade is downstream to the stacking plane, then the sickle percentage is negative. Although increased sickle percentage may result in increased flow that increase may also induce increased power requirements. Thus, an increase in sickle percentage is tempered by other parameter metrics to increase flow while not incurring an increase in power cost.

Pitch angle may refer to an angle between the chord line and stacking plane, defining or depicting how a blade is inclined in the flow direction. Inclination of the blade provides more work carried out by the fan on the surrounding fluid. An increased pitch angle may result in increased flow, but increased pitch angle may also come with the cost of increased power requirements. Thus, an increase in pitch angle may be tempered by other parameter metrics to increase flow while not incurring an increase in power cost. Thus, as described and recited herein, a balanced increase in pitch angle, sickle percentage, and chord length in concert may produce an increased flow without an increase in power cost.

Thus, parameters, particularly chord length, sickle percentage, and pitch angle may be changed to optimize the design in terms of higher static efficiency and structural stability.

In accordance with at least one example embodiment, plane 0, adjacent to hub 4015, may have a chord length of 80 mm, with an acceptable variance of ±10%; a sickle percentage of 62.5%, with an acceptable variance of ±10%; and a pitch of 119°, with an acceptable variance of ±10%. Plane 1 may have a chord length of 110 mm, with an acceptable variance of ±10%; a sickle percentage of 18.9%, with an acceptable variance of ±10%; and a pitch of 119°, with an acceptable variance of ±10%. Plane 2 may have a chord length of 110 mm, with an acceptable variance of ±10%; a sickle percentage of −20%, with an acceptable variance of ±10%; and a pitch of 119°, with an acceptable variance of ±10%. Plane 3 may have a chord length of 110 mm, with an acceptable variance of ±10%; a sickle percentage of −30%, with an acceptable variance of ±10%; and a pitch of 119°, with an acceptable variance of ±10%. Plane 4 may have a chord length of 110 mm, with an acceptable variance of ±10%; a sickle percentage of −20%, with an acceptable variance of ±10%; and a pitch of 119°, with an acceptable variance of ±10%. Plane 5 may have a chord length of 110 mm, with an acceptable variance of ±10%; a sickle percentage of 3.6%, with an acceptable variance of ±10%; and a pitch of 119°, with an acceptable variance of ±10%.

In accordance with at least one other example embodiment, in which parameters of the blade are divided into segments defined in terms of percentage of length, projected outwardly from the root thereof, the blade spans may be regarded as (1) 0-20%, (2) 20-40%, (3) 40-60%, (4) 60-80%, and (5) 80-100%, with the percentages expressing a distance from the root in terms of the length of the radius (r). Further, x may be regarded as a distance expressed as a percentage (%) of r.

At 0-20%, the chord length may be 0.382 r mm, with an acceptable variance of ±10%; the pitch angle may be 119°, with an acceptable variance of ±10%; the sickle percentage, from a front view may be $-3.3139x^2-0.0426x+0.2391\%$, with an acceptable variance of ±10%; and the blade side view may be 0.

At 20-40%, the chord length may be 0.5249 r mm, with an acceptable variance of ±10%; the pitch angle may be 119°, with an acceptable variance of ±10%; the sickle percentage, from a front view may be $1.7268x^2-2.0704x+0.4453\%$, with an acceptable variance of ±10%; and the blade side view may be $0.2061x-0.0374\%$.

At 40-60%, the chord length may be 0.5249 r mm, with an acceptable variance of ±10%; the pitch angle may be 119°, with an acceptable variance of ±10%; the sickle percentage, from a front view may be $1.5228x^2-1.7827+0.3644\%$, with an acceptable variance of ±10%; and the blade side view may be $0.2061x-0.0374\%$.

At 60-80%, the chord length may be 0.5249 r mm, with an acceptable variance of ±10%; the pitch angle may be 119°, with an acceptable variance of ±10%; the sickle percentage, from a front view may be $1.1608x^2-1.3613x+0.2414\%$, with an acceptable variance of ±10%; and the blade side view may be $0.2061x-0.0374\%$.

At 80-100%, the chord length may be 0.5249 r mm, with an acceptable variance of ±10%; the pitch angle may be 119°, with an acceptable variance of ±10%; the sickle percentage, from a front view may be $0.6356x^2-0.5217x--0.0945\%$, with an acceptable variance of ±10%; and the blade side view may be $0.2061x-0.0374$.

Based on the configuration above, the axial fan 4001 operates against higher external static conditions to operate such that power consumption is lowered and performance requirements are met relative to known implementations.

Aspects:

Aspect 1. An axial fan, comprising:

a hub to receive a lock hub that attaches the axial fan to a compressor multiple blades stemming from the hub,
   wherein each of the multiple blades is characterized by having a leading edge and a trailing edge,
   wherein, from a front view of the axial fan relative to a stacking plane that extends from a center of the hub to a leading edge of the respective blade, the leading edge of a respective one of the blades overlaps a trailing edge of a preceding blade, wherein the leading edge of each of the respective blades is downstream to the stacking plane, wherein a gap exists between a stem of the respective blade and a stem of the preceding blade, and wherein the axial fan is a one-piece component produced by an injection molding process.

Aspect 2. The axial fan of Aspect 1, wherein the leading edge is the furthest tip of a respective blade from the hub.

Aspect 3. The axial fan of either of Aspects 1 or 2, wherein the trailing edge is the further upstream point of a respective blade from the hub.

Aspect 4. The axial fan of any of Aspects 1 to 3, wherein the trailing edge is a point on the stem of a respective blade.

Aspect 5. The axial fan of any of Aspects 1 to 4, wherein each of the multiple blades is trimmed to create a slant face near a leading edge thereof.

Aspect 6. The axial fan of any of Aspects 1 to 5, wherein the hub includes a boss to accommodate the lock hub.

Aspect 7. The axial fan of any of Aspects 1 to 6, wherein the lock hub is a taper lock bushing.

Aspect 8. An axial fan, comprising:

a hub;

multiple blades fastened to the hub;

wherein each of the blades includes six planes, and wherein further:

the first plane has a chord length of 80, a sickle length of 50, a sickle percentage of +62.5, and a pitch of 119, the second plane has a chord length of 110, a sickle length of 20.8, a sickle percentage of 18.9, and a pitch of 119, the third plane has a chord length of 110, a sickle length of −22, a sickle percentage of −20, and a pitch of 119, the fourth plane has a chord length of 110, a sickle length of −33, a sickle percentage of −30, and a pitch of 119, the fifth plane has a chord length of 110, a sickle length of −22, a sickle percentage of −20, and a pitch of 119, and the sixth plane has a chord length of 110, a sickle length of 4, a sickle percentage of 3.6, and a pitch of 119.

Aspect 9. The axial fan of Aspect 8, wherein the leading edge is the furthest tip of a respective blade from the hub.

Aspect 10. The axial fan of either of Aspects 8 or 9, wherein the trailing edge is the further upstream point of a respective blade from the hub.

Aspect 11. The axial fan of any of Aspects 8 to 10, wherein the trailing edge is a point on the stem of a respective blade.

Aspect 12. The axial fan of any of Aspects 8 to 11, wherein the hub includes a boss to accommodate the lock hub.

Aspect 13. The axial fan of any of Aspects 8 to 12, wherein the axial fan is a one-piece component produced by an injection molding process.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

We claim:

1. An axial fan, comprising:

a hub to receive a lock hub that attaches the axial fan to a compressor, wherein the hub includes a boss;

multiple blades stemming from the hub;

a bushing accommodated by the boss, wherein the boss is configured to accommodate the bushing to secure a variable number of blades, wherein each of the blades is characterized by having a leading edge and a trailing edge, wherein, from a front view of the axial fan relative to a stacking plane that extends from a center of the hub to a leading edge of the respective blade, the leading edge of a respective one of the blades overlaps a trailing edge of a preceding blade, wherein the leading edge of each of the respective blades is downstream to the stacking plane, wherein a gap exists between a stem of the respective blade and a stem of the preceding blade, wherein the axial fan is produced by an injection molding process, wherein a cooling operation of the compressor is controllable by start/stop mode and the axial fan is operable to provide cooling at lower speeds, and wherein the axial fan is configured to operate at low speeds without a decrease in produced air flow.

2. The axial fan of claim 1, wherein the trailing edge is the further upstream point of a respective blade from the hub.

3. The axial fan of claim 2, wherein the trailing edge is a point on the stem of a respective blade.

4. The axial fan of claim 1, wherein the leading edge is the furthest tip of a respective blade from the hub.

5. The axial fan of claim 1, wherein each of the multiple blades is trimmed to create a slant face near a leading edge thereof.

6. The axial fan of claim 1, wherein the hub includes a boss to accommodate the lock hub.

7. The axial fan of claim 1, wherein the lock hub is a taper lock bushing.

8. The axial fan of claim 1, wherein each of the multiple blades is removably fastened to the hub.

9. The axial fan of claim 1, wherein the axial fan is configured to operate within a casing for a condenser.

10. An axial fan, comprising:

a hub;

multiple blades fastened to the hub;

wherein each of the blades includes six planes, and wherein further:

the first plane has a chord length of 80, a sickle length of 50, a sickle percentage of +62.5, and a pitch of 119, the second plane has a chord length of 110, a sickle length of 20.8, a sickle percentage of 18.9, and a pitch of 119, the third plane has a chord length of 110, a sickle length of −22, a sickle percentage of −20, and a pitch of 119, the fourth plane has a chord length of 110, a sickle length of −33, a sickle percentage of −30, and a pitch of 119, the fifth plane has a chord length of 110, a sickle length of −22, a sickle percentage of −20, and a pitch of 119, and the sixth plane has a chord length of 110, a sickle length of 4, a sickle percentage of 3.6, and a pitch of 119.

11. The axial fan of claim 10, wherein the trailing edge is the further upstream point of a respective blade from the hub.

12. The axial fan of claim 11, wherein the trailing edge is a point on the stem of a respective blade.

13. The axial fan of claim 10, wherein the leading edge is the furthest tip of a respective blade from the hub.

14. The axial fan of claim 10, wherein the hub includes a boss to accommodate the lock hub.

15. The axial fan of claim 10, wherein the axial fan is a one-piece component produced by an injection molding process.

\* \* \* \* \*